United States Patent [19]

Brahm et al.

[11] Patent Number: 5,508,372

[45] Date of Patent: Apr. 16, 1996

[54] ISOCYANATE PREPOLYMERS, A PROCESS FOR THEIR PRODUCTION AND THEIR USE IN ONE-COMPONENT COATING COMPOSITIONS

[75] Inventors: Martin Brahm, Engelskirchen; Lutz Schmalstieg, Cologne; Werner Kubitza, Leverkusen; Wieland Hovestadt, Krefeld; Josef Pedain, Cologne, all of Germany

[73] Assignee: Bayer Aktiengesellschaft, Leverkusen, Germany

[21] Appl. No.: 49,750

[22] Filed: Apr. 19, 1993

[30] Foreign Application Priority Data

Apr. 23, 1992 [DE] Germany ............... 42 13 361.0

[51] Int. Cl.⁶ ............... C09D 133/08; C09D 175/06; C08G 18/62; C08G 18/72

[52] U.S. Cl. ............... 528/80; 528/59; 528/60; 528/66; 528/73; 528/75; 528/81; 525/123; 525/127; 525/329.9; 525/330.5; 544/193; 544/222; 548/952; 560/115; 560/158; 560/355; 560/334; 560/335

[58] Field of Search ............... 525/123, 127, 525/329.9, 330.5; 560/115, 158, 355, 334, 335; 528/80, 81, 83, 60, 66, 73, 59, 75; 544/222, 193; 548/952

[56] References Cited

U.S. PATENT DOCUMENTS

| | | | |
|---|---|---|---|
| 4,145,515 | 3/1979 | Pogozelski et al. | 528/80 |
| 4,355,138 | 10/1982 | Markusch et al. | 525/127 |
| 4,368,320 | 1/1983 | Aldinger et al. | 528/81 |
| 4,442,145 | 4/1984 | Probst et al. | 427/385.5 |
| 4,503,175 | 3/1985 | Houze et al. | 525/123 |
| 4,532,300 | 7/1985 | Lenz et al. | 525/124 |
| 4,565,730 | 1/1986 | Poth et al. | 525/125 |
| 4,578,426 | 3/1986 | Lenz et al. | 525/123 |
| 4,582,888 | 4/1986 | Kase et al. | 544/193 |
| 4,687,813 | 8/1987 | Lenz et al. | 525/131 |
| 4,732,960 | 3/1988 | Rasshofer et al. | 521/75 |
| 4,777,220 | 10/1988 | Halpaap et al. | 528/81 |
| 4,865,705 | 9/1989 | Hendrikx et al. | 528/303 |
| 4,909,915 | 3/1990 | Bederke et al. | 528/303 |
| 5,189,096 | 2/1993 | Boutillier et al. | 525/56 |

OTHER PUBLICATIONS

Glasurit–Handbuch, Lacke und Farben, 11th Edition, pp. 66 et seq. Curt R. Vincentz Verlag, Hannover 1984.
Chemical Abstracts, 78 (1973), Ref. No. 125 963h.

*Primary Examiner*—James J. Seidleck
*Assistant Examiner*—Rabon Sergent
*Attorney, Agent, or Firm*—Joseph C. Gil; Thomas W. Roy

[57] ABSTRACT

The present invention relates to a process for the production of storage stable prepolymers containing free isocyanate groups by reacting a) an organic polyisocyanate component having (cyclo)aliphatically bound isocyanate groups and a maximum functionality of 4.5 with b) one or more hydroxy-functional polyacrylate resins having a content of alcoholic hydroxy groups of 0.05 to 7% by weight at an equivalent ratio of isocyanate groups of component a) to hydroxyl groups of component b) of 3:1 to 40:1, wherein components a) and b) are selected to provide a value B of at most 4 when calculated in accordance with the formula:

$$B = F_1 + 2 \frac{val_A}{val_I} \times F_2$$

wherein $F_1$ and $F_2$ represent the NCO and OH functionalities of components a) and b), $F_1$ representing the component with the lower functionality when the components differ in functionality and $val_A/val_I$ represents the OH/NCO equivalent ratio of components a) and b). The invention also relates to the NCO prepolymers obtained by this process and to their use for the production of one-component, moisture-curing coating compositions.

15 Claims, No Drawings

ISOCYANATE PREPOLYMERS, A PROCESS FOR THEIR PRODUCTION AND THEIR USE IN ONE-COMPONENT COATING COMPOSITIONS

BACKGROUND OF THE INVENTION

1. Field of the Invention

This invention relates to the production of solvent-containing NCO prepolymers based on a) certain lacquer polyisocyanates and b) certain polyhydroxy polyacrylates, to the NCO prepolymers obtained by this process and to their use for the production of one-component, moisture-curing coating compositions.

2. Description of the Prior Art

Moisture-curing one-component coating compositions based on NCO prepolymers are known (Houben-Weyl, Methoden der Organischen Chemie, Vol. E 20, Georg Thieme Verlag, Stuttgart/New York, 1978). The NCO prepolymers are generally prepared by the reaction of aromatic or aliphatic polyisocyanates with polyether or polyester polyols or with short-chain alcohols.

NCO prepolymers having a relatively high functionality and prepared from low molecular weight alcohols, such as butanediol and/or trimethylol propane, generally lead to coatings having inadequate elasticity when they are used as sole binder in one-component coating compositions.

NCO prepolymers based on polyether polyols generally have inadequate light stabilty and UV stability for practical requirements.

Although NCO prepolymers based on polyester polyols do not suffer from these disadvantages, the ester bonds are sensitive to hydrolysis which often leads to inadequate moisture stability of the resulting coatings.

Accordingly, an object of the present invention is to provide new light- and hydrolysis-stable prepolymers containing free isocyanate groups which are suitable for the production of storage stable, one-component coating compositions that are not attended by the above-described disadvantages of the prior art.

This object may be achieved by the process according to the invention for the production of isocyanate prepolymers based on certain lacquer polyisocyanates and certain polyhydroxy polyacrylates which are described in detail hereinafter.

Although hydroxy-functional polyacrylates are known starting materials for the production of polyurethane lacquers, the lacquers in question are generally two-component polyurethane lacquers, which are only prepared just before use by mixing a polyisocyanate component with the polyacrylate component serving as polyol component. (See, for example, Glasurit-Handbuch, Lacke und Farben, 11th Edition, pages 66 et seq., Curt R. Vincentz Verlag, Hannover 1984).

Storage stable, light-stable NCO prepolymers based on polyhydroxy polyacrylates suitable as binders for moisture-curing coating compositions have not previously been known. DE-OS 3 501 857 is concerned with NCO prepolymers prepared from aromatic polyisocyanates, in particular polyisocyanates or polyisocyanate mixtures of the diphenyl methane series, and polyhydroxy polyacrylates. These prepolymers are used for the production of molded plastics by the reaction injection molding (RIM) process. The polyisocyanate preparations described in this document are not suitable for the production of coating compositions, because they only contain aromatically bound isocyanate groups and, accordingly, are not light-stable. They also have an unacceptably high content of monomeric diisocyanates for use in coating technology because of physiological reasons.

Japanese Patent Application 71 37 819, filed Feb. 6, 1971, (Chemical Abstracts, 78 (1973), Ref. No. 125 963h) is directed to NCO prepolymers in which polyhydroxy polyacrylates are incorporated. However, these NCO prepolymers are based on aromatic polyisocyanates (TDI) which, for this reason alone, render them unsuitable for the production of light-stable coating compositions. There is no indication in this Japanese publication as to which starting materials would have to be reacted together to obtain storage stable, light-stable NCO prepolymers which satisfy the objectives of the present invention.

SUMMARY OF THE INVENTION

The present invention relates to a process for the production of storage stable, prepolymers containing free isocyanate groups by reacting a) an organic polyisocyanate component containing one or more lacquer polyisocyanates containing (cyclo)aliphatically bound isocyanate groups, having an isocyanate content of 8 to 25% by weight and having a maximum functionality of 4.5 with b) one or more hydroxy-functional polyacrylate resins having a molecular weight ($M_n$) of 300 to 100,000 and a content of alcoholic hydroxyl groups of 0.05 to 7% by weight in the presence of c) organic solvents and d) optionally other auxiliaries and additives, at an equivalent ratio of isocyanate groups of component a) to hydroxyl groups of component b) and optionally d) of 3:1 to 40:1, wherein the type and quantities of starting components a) and b) are selected to provide a value B of at most 4 when calculated in accordance with the formula:

$$B = F_1 + 2 \frac{val_A}{val_I} \times F_2$$

wherein $F_1$ and $F_2$ represent the NCO and OH functionalities of components a) and b), $F_1$ representing the component with the lower functionality when the components differ in functionality and $val_A/val_I$ represents the OH/NCO equivalent ratio of components a), b) and optionally d).

The invention also relates to the NCO prepolymers obtained by this process.

Finally, the present invention relates to the use of the NCO prepolymers obtained by this process for the production of one-component, moisture-curing coating compositions.

DETAILED DESCRIPTION OF THE INVENTION

Lacquer polyisocyanates containing only (cyclo)aliphatically bound isocyanate groups are used as starting component a) in the process according to the invention. These polyisocyanates have an average NCO functionality of 2.0 to 4.5, preferably 2.0 to 3.9 and more preferably 2.1 to 3.3; an NCO content of 8 to 25% by weight, preferably 11 to 24% by weight; and a content of monomeric starting diisocyanates of less than 0.7% by weight, preferably less than 0.5% by weight.

In accordance with the present invention, the expression "lacquer polyisocyanate" means compounds which meet the preceding requirements or mixtures of such compounds and are obtained by known oligomerization reactions of monomeric isocyanates, preferably diisocyanates containing (cyclo)aliphatically bound isocyanate groups. Suitable oligomerization reactions include carbodiimidization, dimerization, trimerization, biuretization, urea formation, urethanization, allophanatization and/or cyclization with formation of oxadiazine structures. In many oligomerization reactions, several of the reactions mentioned take place simultaneously or successively. In a particularly preferred embodiment, the "lacquer polyisocyanates" are (i) biuret polyisocyanates, (ii) polyisocyanates containing isocyanurate groups, (iii) polyisocyanate mixtures containing isocyanurate and uretdione groups or (iv) polyisocyanate mixtures containing urethane and/or allophanate groups prepared from the monomeric diisocyanates mentioned hereinafter.

Processes for the production of the oligomerization products from monomeric starting diisocyanates are described, for example, in DE-OS 1 595 273, DE-OS 3 700 209 and 3 900 053 or in EP-A-O 330 966, EP-A-O 259 233, EP-A-O 377 177 and U.S. Pat. No. 4,385,171.

Suitable starting compounds for the production of the lacquer polyisocyanates include diisocyanates having a molecular weight of 140 to 400, such as 1,4-diisocyanatobutane, 1,6-diisocyanatohexane (HDI), 1,5-diisocyanato-2,2-dimethyl pentane, 2,2,4- and 2,4,4-trimethyl-1,6-diisocyanatohexane, 1,10-diisocyanatodecane, 1-isocyanato-3,3,5-trimethyl-5-isocyanatomethyl cyclohexane (IPDI), perhydro-2,4'- and -4,4'- and -2,2'-diphenyl methane diisocyanate, 1,12-dodecane diisocyanate, cyclohexane-1,3- and -1,4-diisocyanate, xylylene diisocyanate isomers, 1,4- and 1,3-tetramethyl xylylene diisocyanate and mixtures of these diisocyanates. The lacquer polyisocyanates a) are preferably prepared from HDI and/or IPDI, more preferably HDI.

To reduce the functionality of the final products, monoisocyanates, such as cyclohexyl isocyanate, benzyl isocyanate or n-hexyl isocyanate, may also be used in the production of lacquer polyisocyanates a), although their use is less preferred. In order to guarantee adequate storage stability of the end products according to the invention, it is important for the NCO functionality of the lacquer polyisocyanates a) to be within the limits mentioned above. The functionality values are calculated from the average molecular weight ($M_n$, as determined by vapor pressure osmometry) and the titrated NCO content.

The polyacrylate resins b) are known hydroxy-functional poly(meth)acrylates or mixtures thereof having molecular weights ($M_n$) of 300 to 180,000, preferably 500 to 30,000. The molecular weight ($M_n$) is determined by gel permeation chromatography using polystyrene as standard.

The polyacrylate resins b) have a hydroxyl group content of 0.05 to 7% by weight, preferably 0.5 to 5% by weight. The average functionality of the polyacrylate resins, which may be determined from the average molecular weight ($M_n$) and the titrated hydroxyl group content, is generally 1.5 to 15, preferably 2.1 to 11 and more preferably of 2.5 to 7.5.

The composition of the monomers used for the production of the polyacrylate resins b) is not critical to the invention provided that polyacrylate resins which satisfy the requirements mentioned above are obtained in the copolymerization reaction.

Monomers containing alcoholic hydroxyl groups (i) and monomers which do not contain functional groups (ii) are used in particular. The use of monomers containing other functional groups than hydroxyl groups (iii), such as carboxyl groups, epoxide groups or amino groups, is possible in small quantities, but is not preferred. In general, the quantity of monomers (iii), if they are used at all, is at most 3% by weight, preferably at most 1% by weight, based on the total weight of the monomers used.

Suitable hydroxy-functional monomers (i) include glycerol monoallyl ether, trimethylol propane monoallyl ether, 2-hydroxyethyl allyl ether, 2-hydroxyethyl acrylate, 2-hydroxypropyl acrylate, 1-hydroxymethyl ethyl acrylate, 2-, 3- and 4-hydroxybutyl acrylate, the isomeric hydroxypentyl acrylates, the isomeric hydroxyhexyl acrylates and the methacrylates corresponding to these acrylates. The hydroxy-functional hydroxyalkyl esters may contain both primary and secondary hydroxyl groups.

In another possible variant, the hydroxy-functional monomers are completely or partly replaced by modification products obtained by subjecting the hydroxyalkyl (meth) acrylates to a modification reaction. Suitable modification reactions include the addition of cyclic esters, such as ε-caprolactone, with ring-opening esterification or the addition of epoxides, such as ethylene oxide, propylene oxide, butylene oxide or 2-ethylhexyl glycidyl ether, with ring-opening etherification.

Instead of the addition of epoxides onto previously mentioned hydroxyalkyl monomers, correspondingly larger quantities of alkylene oxides (more than 1 mole of alkylene oxide per mole of acid) may also be used to prepare monomers (i) by the alkoxylation of acrylic acid or methacrylic acid to directly produce monomers containing hydroxyl and ether groups.

The use of such monomers containing ether groups or even additional ester groups is not preferred. In accordance with the present invention, mixtures of any of the preceding monomers may also be used.

Suitable monomers without functional groups (in the context of the isocyanate addition reaction) include monoolefinically unsaturated compounds having a molecular weight of 28 to 400, preferably of 80 to 220. Examples of these compounds include alkyl or cycloalkyl acrylates or methacrylates containing 1 to 18, preferably 1 to 6 carbon atoms, in the alkyl or cycloalkyl radical, such the methyl, ethyl, n-propyl, n-butyl, isopropyl, isobutyl, t-butyl, the isomeric pentyl, hexyl, octyl, dodecyl, hexadecyl, octadecyl, 3,5,5-trimethyl cyclohexyl, isobornyl or cyclohexyl esters of acrylic or methacrylic acid. Additional examples include acrylonitrile, ethylene, propylene, but-1-ene, hex-1-ene, oct-1-ene, vinyl ether, methacrylonitrile, vinyl acetate, vinyl chloride, styrene, α methyl styrene, vinyl toluene, neutral esters of polybasic carboxylic acids (such as maleic acid or fumaric acid dialkyl ester) and mixtures of these monomers.

Suitable monomers (iii) which may optionally be used include anhydride-functional unsaturated monomers such as itaconic anhydride or maleic anhydride; carboxy-functional unsaturated monomers such as acrylic acid, methacrylic acid, itaconic acid, crotonic acid, and semiesters of maleic acid and fumaric acid and mixtures thereof; and epoxy-functional unsaturated monomers, such as glycidyl methacrylate, glycidyl acrylate and mixtures thereof.

The radical polymerization may be initiated by high-energy radiation and also by peroxide compounds, e.g., symmetrical diacyl peroxides such as acetyl, propionyl, butyryl peroxide and lauroyl peroxide; symmetrical peroxydicarbonates such as diethyl, diisopropyl, dicyclohexyl and dibenzyl peroxycarbonate; dibenzoyl peroxide and bromine-, nitro-, methyl- or methoxy-substituted benzoyl peroxides; dicumyl peroxide, cumene hydroperoxide, ditert. butyl peroxide, tert. butyl peroxy-2-ethyl hexanoate, tert. butyl perpivalate, tert. butyl peroctoate, tert. butyl phenyl peracetate, tert. butyl-N-(phenylperoxy)-carbonate, tert. butyl-No(2,3- or -4-chlorophenylperoxy)-carbonate, tert. butyl hydroperoxide, 2,2-di-tert. butyl peroxybutane, tert. amyl perbenzoate, 1,3-bis-(tert. butylperoxyisopropyl)-benzene, butanone peroxide, and diisopropylbenzene monohydroperoxide; peroxyketals such as 2,2-di-(tert. amylperoxy)-propane and ethyl-3,3-di-(tert. amylperoxy)-butyrate; aliphatic azo compounds such as azo-bis-isobutyronitrile, azo-bis-cyclohexane nitrile, azo-bis-2-methyl valeronitrile and 2,2'-azo-bis-isobutyric acid alkyl ester; and thermolabile highly substituted ethane derivatives such as those based on benzpinakol or silyl-substituted ethane derivatives.

The polymerization reaction to form polyacrylate resins b) preferably takes place in known manner in a suitable solvent or solvent mixture. Suitable solvents for use as the polymerization medium include toluene, xylene, chlorobenzene, butyl acetate, ethyl acetate, ethyl glycol acetate, pentyl acetate, hexyl acetate, methoxypropyl acetate, tetrahydrofuran, dioxane, acetone and methyl ethyl ketone. Also suitable are aromatic hydrocarbons having relatively high degrees of substitution such as solvent Naphtha , heavy gasoline, Solvesso solvents, Shellsol solvents and Diasol solvents; and also relatively high-boiling aliphatic and cycloaliphatic hydrocarbons such as white spirits, mineral turpentine oil, Isobar solvents, Nappar solvents, and tetral in and decalin. Mixtures of these solvents may also be used.

The process according to the invention is preferably carried out using solutions of polyacrylate resins b); for example, the solutions directly accumulating in the production of the polyacrylate resins may be used. However, the solvents used in the production of the polyacrylate resins may also be removed by distillation and replaced by other solvents or solvent mixtures. It is also possible to use polyacrylate resins produced without solvents which may be blended with a suitable solvent or solvent mixture, for example, before the reaction according to the invention is carried out. In general, component b) is used in the form of a 30 to 90% by weight solution in solvents or solvent mixtures, such as those previously set forth. The polyisocyanate component a) may also be used in the form of a solution in a solvent or in the absence of a solvent in accordance with the process according to the invention.

In addition to starting components a) and b) and solvents c), which are critical to the invention, other auxiliaries and additives d) may optionally be present in the reaction mixtures used in the process according to the invention. Examples of these other auxiliaries and additives include the hydroxy-functional polyesters, polyethers or polycarbonates which are known for the production of moisture-curing NCO prepolymers. However, the use of these other polyhydroxyl compounds is less preferred and takes place at most in quantities of up to 20% by weight, preferably up to 10% by weight, based on the weight of solvent-free component b).

Other auxiliaries and additives d) which may optionally be used include the catalysts and/or stabilizers described hereinafter which may be incorporated in the reaction mixture or the reaction product before or after the process according to the invention.

The reaction according to the invention is generally carried out at a temperature of 20° to 130° C., preferably 40° to 100° C. The solvent which is present during the reaction according to the invention corresponds in an amount of 10 to 90% by weight, preferably 40 to 90% by weight, based on the weight of starting components a) and b).

To carry out the reaction according to the invention, starting components a) and b) and the other optional compounds d) containing alcoholic hydroxyl groups are used in quantities which correspond to an NCO:OH equivalent ratio of 3:1 to 40:1, preferably 5:1 to 35:1 and more preferably 7:1 to 25:1. It is apparent from these ratios that the products obtained in accordance with the process according to the invention are mixtures of reaction products containing urethane groups of part of component a) and component b) and excess lacquer polyisocyanate a) in solution in solvents. The expression "NCO prepolymer" as used in the context of the invention is also intended to encompass these mixtures of reaction products containing urethane groups and excess lacquer polyisocyanate a).

It has been found that to achieve the objects of the present invention and also to optimize the storage stability of the products obtained by the process according to the invention, it is important not only to adhere strictly to the previously mentioned requirements regarding components a) and b) and the equivalent ratio of the starting components, but also to ensure that the value of B is at most 4 when calculated in accordance with the formula $$B = F_1 + 2\frac{val_A}{val_I} \times F_2$$

wherein $F_1$ and $F_2$ represent the NCO and OH functionalities of components a) and b), $F_1$ representing the component with the lower functionality when the components differ in functionality, and $val_A/val_I$ represents the equivalent ratio of component a) to component b), i.e., the OH/NCO equivalent ratio.

It is assumed in this regard that the preferred procedure is adopted, i.e., the procedure in which the isocyanate-reactive compounds are made up solely of polyacrylate resins b). If other hydroxy-functional reactants d) are used, the resulting average values for the entire polyhydroxyl component must be introduced into the equation.

As already indicated, other auxiliaries and additives d) may be incorporated into the end products of the process. If they are inert to hydroxyl groups, these auxiliaries and additives may also be added to the reaction mixture before the process according to the invention is carried out.

Suitable auxiliaries and additives include additional amounts of the previously mentioned solvents. Other suitable auxiliaries and additives include catalysts for the isocyanate addition reaction, e.g, triethyl amine, tributyl amine, 1,4-diazabicyclo-(2,2,2)-octane, N,N-dimethylbenzyl amine, 2-methyl imidazole, pyridine, Mannich bases, tetraalkyl ammonium hydroxides, alkali metal hydroxides such as sodium hydroxide, alkali metal phenolates, metal salts such as iron(III) chloride, and tin compounds such as tin(II) acetate, tin(II) octoate, tin(II) ethyl hexanoate, tin(II) laurate, dibutyl tin oxide, dibutyl tin dichloride, dibutyl tin diacetate, dibutyl tin dilaurate, dibutyl tin maleate and dioctyl tin diacetate.

The catalysts are generally present in the end products according to the invention or the moisture-curing, one-component lacquers prepared therefrom in a quantity of 0.001 to 10% by weight, preferably of 0.01 to 1% by weight.

Other auxiliaries and additives which may be added to the products according to the invention or to the coating compositions produced therefrom include stabilizers, e.g., compounds showing an acidic reaction such as hydrochloric acid or 2-chloropropionic acid; acid halides such as benzoyl chloride or isophthaloyl chloride; and compounds containing a highly reactive isocyanate group such as carbonyl isocyanates or sulfonyl isocyanates, for example, p-tolylsulfonyl isocyanate (tosyl isocyanate), or isocyanatobenzoyl chlorides, in concentrations of up to 3%, preferably up to 1% and more preferably up to 0.5% by weight, based on the weight of the NCO prepolymers.

In the production of ready-to-use coating compositions using the prepolymers according to the invention, the prepolymers may be mixed with other auxiliaries and additives conventionally used in polyurethane lacquer technology, including flow control agents based on cellulose esters, oligoalkyl acrylates, pigments and fillers, viscosity-controlling additives such as bentonites and silicic acid esters, matting agents such as silica, aluminium silicates and high molecular weight waxes.

The coating compositions based on the products obtained by the process according to the invention may be applied to substrates of any kind, including metals, wood, masonry, concrete, glass, ceramics, plastics, textiles or paper, by any of the methods used in lacquer technology, including spray coating, spread coating, dip coating, casting or roll coating.

The coating compositions according to the invention are distinguished by excellent stability to hydrolysis and light, rapid drying at temperatures of 10° to 60° C. and good levelling and result in coatings with good color and clarity and excellent mechanical properties.

The following examples are intended to illustrate the invention without limiting it in any way. All parts and percentages are by weight unless otherwise indicated.

Lacquer Polyisocyanates

A) An HDI-based polyisocyanate containing uretdione and isocyanurate groups according to Example 2 of DE-OS 3 900 053 (U.S. Pat. No. 4,994,451, herein incorporated by reference).

NCO content: 22%

Free HDI: <0.5%

Functionality: 2.3; calculated from the average molecular weight ($M_n$, as determined by vapor pressure osmometry) and the NCO content B) An HDI-based lacquer polyisocyanate containing isocyanate groups according to Example 1 of EP-A-O 010 589 (U.S. Pat. No. 4,324,879, herein incorporated by reference).

NCO content: 21.5%

Free HDI: <0.5%

Functionality: 3.9; calculated from the average molecular weight ($M_n$, as determined by vapor pressure osmometry) and the NCO content C) A lacquer polyisocyanate produced from 666 g (6 equiv) of IPDI and 73 g (1 equiv) of 2-ethylhexane-1,3-diol at 80° C. (reaction time: 2.5 h). After thin-layer distillation at 150° C. under a pressure of 0.1 mbar, 254 g of a colorless polyisocyanate were obtained.

NCO content: 12.7%

Free IPDI: <0.1%

Functionality: 2.0

The product was used in the form of a 75% solution in butyl acetate.

NCO content of the solution: 9.5%

Hydroxy-functional Polyacrylate Polyols

D) Part I was introduced into a 15 liter stainless steel reactor equipped with a stirrer and cooling and heating system. Part II was then added over a period of 3.0 hours and, at the same time, part III was added over a period of 3.5 hours. The mixture was then stirred for 2 hours at 140° C.

| I | 2500 parts xylene |
| | 1900 parts n-butyl acetate |
| II | 3200 parts methyl methacrylate |
| | 800 parts 2-hydroxyethyl methacrylate |
| | 920 parts 2-ethylhexyl acrylate |
| | 50 parts acrylic acid |
| III | 70 parts ditert. butyl peroxide |
| | 560 parts butyl acetate |

The polyacrylate had a solids content of 50% and a viscosity of 4000 mPa.s.

OH content: 2.0% (based on solids)

OH functionality: 8; calculated from the molecular weight ($M_n$= 6800, as determined by gel permeation chromatography using polystyrene as standard) and the titrimetrically determined OH content E) Part I was introduced into a 15 liter stainless steel reactor equipped with a stirrer and cooling and heating system. Part II was then added over a period of 3.0 hours and, at the same time, part III was added over a period of 3.5 hours. The mixture was then stirred for 2 hours at 140° C.

| I | 3200 parts xylene |
| II | 2800 parts styrene |
| | 1300 parts hydroxypropyl methacrylate* |
| | 1800 parts n-butyl acrylate |
| | 40 parts acrylic acid |
| III | 150 parts ditert. butylperoxy-2-ethyl hexanoate, 70% in butyl acetate |
| | 710 parts butyl acetate |

*Isomer mixture obtained by addition of propylene oxide onto acrylic acid having an OH-content of 14.8%

The polyacrylate had a solids content of 50% and a viscosity of 1,500 mPa.s.

OH content: 2.67% (based on solids)

OH functionality: 7.5; determined as described for polyacrylate D

F) Part I was introduced into a 10 liter stainless steel reactor equipped with a stirrer and cooling and heating system and heated to 125° C. Part II was then introduced over a period of 3.0 hours and, at the same time, part III was introduced over a period of 3.5 hours. The mixture was then stirred for 2 hours at 120° C.

| I | 2227 parts xylene |
| | 1669 parts butyl acetate |
| II | 2960 parts methyl methacrylate |
| | 689 parts hydroxyethyl methacrylate |
| | 562 parts n-butyl methacrylate |
| | 42 parts acrylic acid |
| III | 417 parts tert. butylperoxy-2-ethyl hexanoate, 70% in butyl acetate |
| | 435 parts butyl acetate |

The polyacrylate had a solids content of 50% and a viscosity of 1000 mPa.s.

OH content: 2.0% (based on solids)

OH functionality: 3.5; determined as described for polyacrylate D

EXAMPLES 1 TO 12

Production of NCO-functional Polyacrylate Prepolymers 1 to 8 According to the Invention and Comparison NCO-functional Polyacrylate Prepolymers 9 to 12.

Z equivalents of polyacrylate polyol were added dropwise at a temperature of 60° C. to X equivalents of a lacquer polyisocyanate and Y g of butyl acetate as solvent and the mixture was stirred at a temperature of 60° C. until the theoretical NCO content had been reached.

| No. | X in equiv | Lacquer polyisocyanate | Z in equiv | Polyacrylate | Y in g | NCO content | B value | Stabilization[1] | Stability in storage[2] |
|---|---|---|---|---|---|---|---|---|---|
| | | | | Examples 1 to 8: Invention | | | | | |
| 1 | 1.0 | A | 0.1 | F | 191 | 6.8 | 3.0 | No | Yes |
| 2 | 0.8 | A | 0.1 | F | 151 | 6.2 | 3.2 | No | Yes |
| 3 | 1.0 | A | 0.1 | F | 31 | 9.4 | 3.0 | Yes | Yes |
| 4 | 1.0 | 0.6 equiv A + 0.4 equiv B | 0.1 | F | 194 | 6.6 | 3.6 | No | Yes |
| 5 | 1.0 | C | 0.1 | D | 444 | 3.7 | 3.6 | No | Yes |
| 5 | 1.0 | D | 0.1 | F | 282 | 5.0 | 2.7 | No | Yes |
| 7 | 0.7 | A | 0.2 | 0.1 equiv F + 0.1 equiv 2-ethyl hexanol | 149 | 6.6 | 2.7 | Yes | Yes |
| 8 | 1.0 | C | 0.1 | E | 180 | 6.7 | 3.5 | Yes | Yes |
| | | | | Example 9 to 12 Comparison | | | | | |
| 9 | 0.4 | A | 0.1 | F | 24 | 4.7 | 4.1 | No | No |
| 10 | 0.8 | B | 0.1 | F | 185 | 5.3 | 4.5 | Yes | No |
| 11 | 1.0 | B | 0.1 | D | 190 | 6.2 | 5.5 | Yes | No |
| 12 | 0.8 | A | 0.1 | D | 185 | 6.2 | 4.3 | Yes | No |

[1] Stabilization by addition of 0.5% tosyl isocyanate, based on the right of the mixture as a whole
[2] Storage stability was confirmed if the solution obtained did not gel after storage for 3 months at room temperature

EXAMPLE 13

100 parts of a solution of the polyisocyanate prepolymer according to Example 3 in n-butyl acetate having an NCO content of 9.4%, were carefully stirred with 0.6 part of a 50% solution of the dibutyl tin dilaurate in solvent naphtha 100 solvent. The storage stable, moisture-curing one-component polyurethane lacquer, which had a viscosity of approx. 300 mPa.s, was knife-coated onto a glass plate in a wet film thickness of 150 µm (which corresponded to a dry film thickness of approximately 50 to 60 µm). A completely transparent, glossy, defect-free film was formed. The properties of the liquid lacquer and the lacquer film, which was completely hardened after 10 to 14 days, were as follows:

Liquid lacquer:

| | |
|---|---|
| Stability in storage: | Very good |
| Dust dry: | Approx. 40 mins. |
| Sand dry: | 3.5–4.0 h |
| Fully dry: | Approx. 4 h |
| Load-bearing: | After 24 h |

Lacquer film:

| | |
|---|---|
| Pendulum hardness (Albert/König): | 170–180s |
| Machining test: | Hard and tough |
| Appearance (gloss/transparency): | Very good |

Solvent resistance:

| | |
|---|---|
| White spirit: | Very good |
| Solvent naphtha 100: | Very good |
| Methoxypropyl acetate: | Very good |
| Acetone: | Very good |
| Ethanol: | Very good |
| Abrasion resistance: | Good |
| (Taber Abrasion, 1000 revolutions, CS 10 abrasive rollers, 1 kg weight on each roller) | (25–30 mg weight loss) |

EXAMPLE 14

100 parts of a solution of the polyisocyanate prepolymer of Example 4 in butyl acetate were carefully stirred with 0.6 parts of a 50% solution of dibutyl tin dilaurate in solvent naphtha 100. The storage stable, moisture-curing one-component polyurethane clear lacquer, which had a viscosity of approx. 100 mPa.s, was knife-coated onto a glass plate in a wet film thickness of 150 µm (which corresponded to a dry film thickness of approximately 50 to 60 µm). A completely transparent, glossy, defect-free film was formed. The properties of the liquid lacquer and the clear lacquer film, which was completely hardened after 10 to 14 days, were as follows:

Liquid lacquer:

| | |
|---|---|
| Stability in storage: | Very good |
| Dust dry: | 50–60 mins. |
| Sand dry: | Approx. 3 h |
| Fully dry: | Approx. 4 h |

Lacquer film:

| | |
|---|---|
| Pendulum hardness: | 190–200s |
| Machining test: | Hard |
| Load-bearing | After 24 h |
| Appearance: | Very good |

Solvent resistance:

| | |
|---|---|
| White spirit: | Very good |
| Solvent naphtha 100: | Very good |
| Methoxypropyl acetate: | Very good |
| Acetone: | Very good |
| Ethanol: | Very good |
| Abrasion resistance: (determined as in Example 13) | Approx. 30 mg |

EXAMPLE 15

100 parts of the solution of the polyisocyanate prepolymer of Example 4 in butyl acetate were mixed and homogeneously stirred with 7.9 parts of a commercially available wetting agent (Disperbyk 161, a product of Byk, Wesel) and 0.8 parts of a drying agent (tolylene sulfonyl monoisocyanate).

71.3 parts of a commercially available rutile titanium dioxide (Bayertitan R-KB-4) were then added and the mixture was dispersed for 15 minutes with a dissolver disk at a speed of 10 to 15 m/sec. After cooling of the dispersion to room temperature, 66.7 parts of polyisocyanate prepolymer 2, 0.8 part of a commercially available foam inhibitor (Byk 051, a product of Byk, Wesel) and 1.0 part of the catalyst solution mentioned in Example 14 were introduced and homogenized.

A storage stable, moisture-curing, one-component polyurethane white lacquer having a viscosity of 300 mPa.s was formed. The white lacquer was applied by knife coating in a wet film layer thickness of 150 μm (which corresponded to a dry film thickness of approximately 60 μm). A glossy, defect-free white lacquer film with good levelling properties was formed. The properties of the liquid lacquer and the lacquer film, which was completely hardened after 10 to 14 days, were as follows:

| Liquid lacquer: | |
| --- | --- |
| Stability in storage: | Very good |
| Dust dry: | Approx. 45 mins. |
| Sand dry: | Approx. 3 h |
| Fully dry: | Approx. 4 h |
| Lacquer film: | |
| Pendulum hardness: | Approx. 200s |
| Machining test: | Hard |
| Load-bearing | After 24 h |
| Appearance: | Very good |
| Solvent resistance: | |
| White spirit: | Very good |
| Solvent naphtha 100: | Very good |
| Methoxypropyl acetate: | Very good |
| Acetone: | Very good |
| Ethanol: | Very good |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a storage stable, prepolymer that contains free isocyanate groups and does not gel after storage for 3 months at room temperature which comprises reacting a) an organic polyisocyanate component containing one or more lacquer polyisocyanates containing (cyclo)aliphatically bound isocyanate groups, having an isocyanate content of 8 to 25% by weight and having a maximum functionality of 4.5 with b) one or more hydroxy-functional polyacrylate resins having a molecular weight ($M_n$) of 300 to 100,000 and a content of alcoholic hydroxyl groups of 0.05 to 7% by weight in the presence of c) organic solvents and d) up to 20% by weight, based on the weight of solvent-free component b), of one or more hydroxy-functional polyesters, polyethers or polycarbonates, at an equivalent ratio of isocyanate groups of component a) to hydroxyl groups of components b) and d) of 3:1 to 40:1, wherein the type and quantities of starting components a) and b) are selected to provide a value B of at most 4 when calculated in accordance with the formula:

$$B = F_1 + 2\frac{\text{val}_A}{\text{val}_I} \times F_2$$

wherein $F_1$ and $F_2$ represent the NCO and OH functionalities of components a) and b), $F_1$ representing the component with the lower functionality when the components differ in functionality and $\text{val}_A/\text{val}_1$ represents the OH/NCO equivalent ratio of components a), b) and d).

2. The process of claim 1 wherein component a) has an average NCO functionality of 2.1 to 3.3.

3. The process of claim 1 wherein component b) has an average hydroxyl functionality of 1.5 to 15.

4. The process of claim 2 wherein component b) has an average hydroxyl functionality of 1.5 to 15.

5. The process of claim 1 wherein component b) has an average hydroxyl functionality of 2.5 to 7.5.

6. The process of claim 2 wherein component b) has an average hydroxyl functionality of 2.5 to 7.5.

7. The process of claim 1 wherein the equivalent ratio of isocyanate groups of component a) to hydroxyl groups of components b) and d) is 5:1 to 35:1.

8. A storage stable, prepolymer that contains free isocyanate groups and does not gel after storage for 3 months at room temperature which is prepared by a process which comprises reacting a) an organic polyisocyanate component containing one or more lacquer polyisocyanates containing (cyclo)aliphatically bound isocyanate groups, having an isocyanate content of 8 to 25% by weight and having a maximum functionality of 4.5 with b) one or more hydroxy-functional polyacrylate resins having a molecular weight ($M_n$) of 300 to 100,000 and a content of alcoholic hydroxyl groups of 0.05 to 7% by weight in the presence of c) organic solvents and d) up to 20% by weight, based on the weight of solvent-free component b), of one or more hydroxy-functional polyesters, polyethers or polycarbonates, at an equivalent ratio of isocyanate groups of component a) to hydroxyl groups of components b) and d) of 3:1 to 40:1, wherein the type and quantities of starting components a) and b) are selected to provide a value B of at most 4 when calculated in accordance with the formula:

$$B = F_1 + 2\frac{\text{val}_A}{\text{val}_I} \times F_2$$

wherein $F_1$ and $F_2$ represent the NCO and OH functionalities of components a) and b), $F_1$ representing the component with the lower functionality when the components differ in functionality and $\text{val}_A/\text{val}_1$ represents the OH/NCO equivalent ratio of components a), b) and d).

9. The prepolymer of claim 8 wherein component a) has an average NCO functionality of 2.1 to 3.3.

10. The prepolymer of claim 8 wherein component b) has an average hydroxyl functionality of 1.5 to 15.

11. The prepolymer of claim 9 wherein component b) has an average hydroxyl functionality of 1.5 to 15.

12. The prepolymer of claim 8 wherein component b) has an average hydroxyl functionality of 2.5 to 7.5.

13. The prepolymer of claim 9 wherein component b) has an average hydroxyl functionality of 2.5 to 7.5.

14. A one-component, moisture-curing binding-containing coating composition wherein the binder consists essentially of the prepolymer of claim 8.

15. The prepolymer of claim 8 wherein the equivalent ratio of isocyanate groups of component a) to hydroxyl groups of components b) and d) is 5:1 to 35:1.

* * * * *